Patented Dec. 15, 1925.

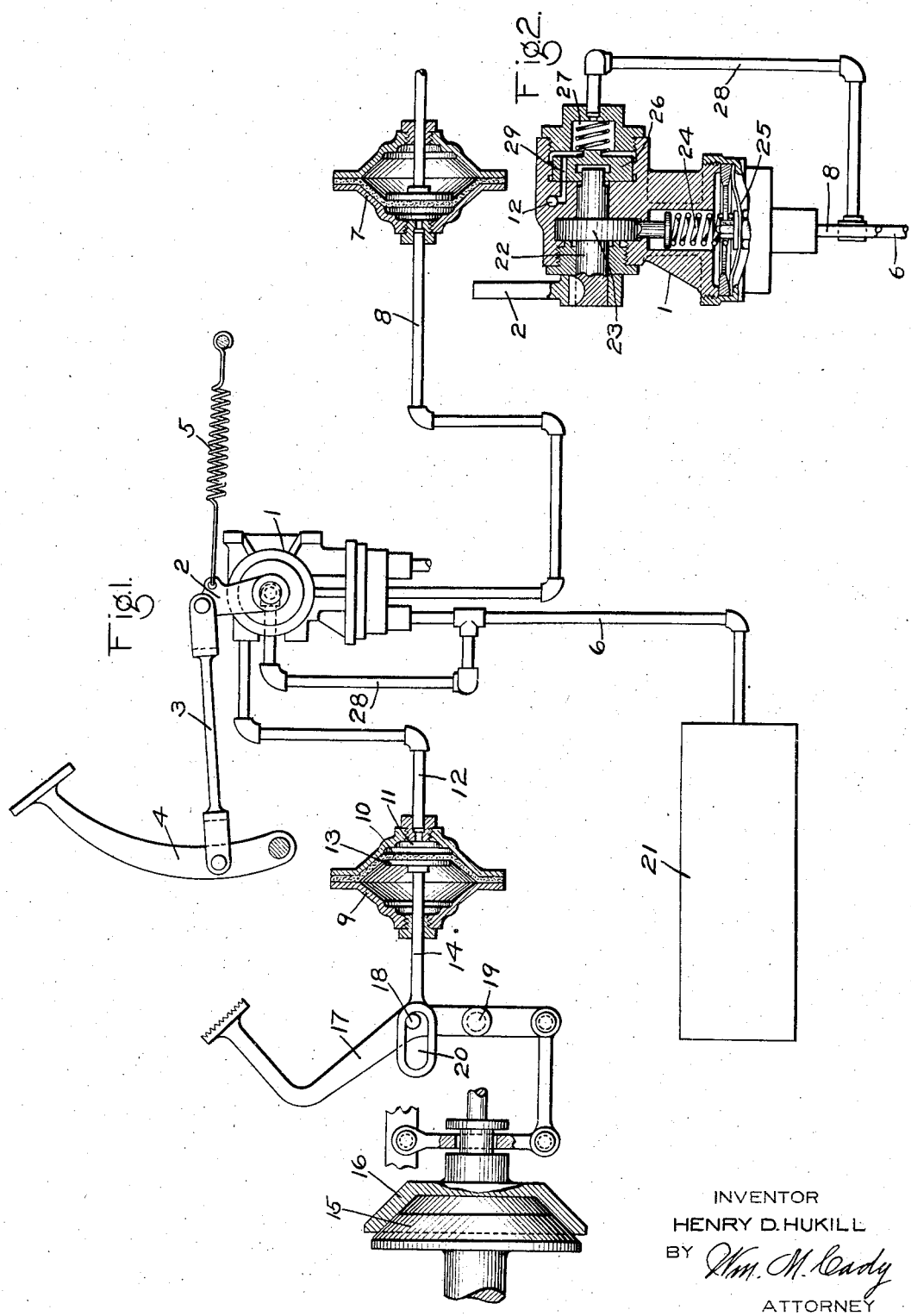

1,565,458

UNITED STATES PATENT OFFICE.

HENRY D. HUKILL, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

MOTOR-VEHICLE-CONTROL DEVICE.

Application filed August 20, 1924. Serial No. 733,108.

*To all whom it may concern:*

Be it known that I, HENRY D. HUKILL, a citizen of the United States, residing at Pittsburgh, in the county of Allegheny and State of Pennsylvania, have invented new and useful Improvements in Motor-Vehicle-Control Devices, of which the following is a specification.

This invention relates to motor vehicle controlling devices and has for its principal object to provide means for applying the brakes and for disengaging the engine clutch when the operator becomes incapacitated.

In the accompanying drawing; Fig. 1 is a diagrammatic view of a motor vehicle controlling apparatus embodying my improvement; and Fig. 2 a central vertical section of the brake valve device.

As shown in the drawing, the apparatus may comprise a brake valve device 1 having an operating arm 2, which may be connected by a rod 3 with a pedal lever 4. A spring 5 is connected to the arm 2 and tends to move the brake valve to emergency position, when the operator removes his foot from the pedal lever 4.

A source of fluid under pressure such as the reservoir 21 is connected to the brake valve device by way of pipe 6 and a brake chamber 7 is connected through pipe 8 to said brake valve device.

According to my invention, when the brake valve device is thrown to emergency position, the engine clutch is automatically disengaged and for this purpose a diaphragm chamber 9 is provided which contains a flexible diaphragm 10. The chamber 11 at one side of the diaphragm 10 is connected through pipe 12 with the brake valve device 1 and engaging said diaphragm at the opposite side is a pressure plate 13 carrying a rod 14. The usual engine clutch is represented diagrammatically in the drawing by the reference numeral 15 and operatively connected to the moving part 16 of the clutch is the usual clutch operating pedal lever 17. Said lever is provided with a pin 18 located above the fulcrum point 19 and the diaphragm rod 14 is provided with an end portion having an elongated slot 20 in which said pin engages.

As shown in Fig. 2, the brake valve device 1 includes a rotatable spindle 22 connected to the operating arm 2 and provided with a cam 23 for varying the compression of spring 24. Said spring acts on a flexible diaphragm 25 and the movement of the flexible diaphragm controls the operation of valves (not shown) by which the admission and release of fluid under pressure to and from the brake chamber 7 is effected.

The spindle 22 is also adapted to operate a rotary slide valve 26 contained in valve chamber 27, said valve chamber being connected through pipe 28 with the fluid pressure supply pipe 6.

Pipe and passage 12 leads to the seat of the rotary valve 26 and in emergency position the pipe 12 is connected to rotary valve chamber 27 through a port 29 in the valve. In other positions of the rotary valve, the pipe 12 is connected through a cavity (not shown) in the rotary valve with an atmospheric exhaust port.

In operation, when the operator has his foot on the pedal lever 4 and holds same in the position shown, the brake valve ports are positioned so that the brakes are released and the clutch operating diaphragm chamber 11 is connected to the atmosphere. If it is desired to apply the brakes, the operator allows the pedal lever 4 to move in a clockwise direction. This permits a corresponding movement of the arm 2 and the cam 23 is then positioned so as to compress the spring 24 and thereby causes the diaphragm 25 to operate and thus cause the opening of a valve for supplying fluid under pressure to the brake chamber 7.

If the operator should entirely remove his foot from the pedal lever 4, as when he becomes incapacitated, the spring 5 will act to throw the arm 2 to emergency position, in which fluid under pressure is supplied to the brake chamber 7 and in which the rotary valve 26 is moved to the position shown in Fig. 2. Fluid under pressure is therefore supplied from valve chamber 27, through port 29 to pipe 12 and thus the diaphragm 10 is operated by fluid supplied to chamber 11, so as to shift the rod 14 outwardly. The outward movement of the rod 14 then effects the movement of the pedal lever 17, so as to shift the movable member 16 of the engine clutch and thereby disengage the clutch.

Having now described my invention, what

I claim as new and desire to secure by Letters Patent, is:—

1. In a vehicle control mechanism, the combination with an engine clutch and a vehicle brake, of fluid pressure operated means for controlling the engine clutch, fluid pressure operated means for applying the brakes, and means operated upon release by the operator for supplying fluid under pressure to operate said clutch operating means and said brake applying means.

2. In a vehicle control mechanism, the combination with a fluid pressure brake chamber and an engine clutch, of means operated by fluid under pressure for disengaging said clutch, and means operated upon release by the vehicle operator for simultaneously supplying fluid under pressure to said brake chamber and to said clutch operating means.

In testimony whereof I have hereunto set my hand.

HENRY D. HUKILL.